(12) United States Patent
Pan et al.

(10) Patent No.: US 9,259,724 B2
(45) Date of Patent: Feb. 16, 2016

(54) SUPPORTED BIMETALLIC NANOCOMPOSITE CATALYST AND THE PREPARATION METHOD THEREOF

(75) Inventors: Bingcai Pan, Jiangsu (CN); Lei Yang, Jiangsu (CN); Shujuan Zhang, Jiangsu (CN); Weiming Zhang, Jiangsu (CN); Lu Lv, Jiangsu (CN)

(73) Assignees: NANJING UNIVERSITY (CN); JIANGSU YONGTAI ENVIRONMENTAL SCIENCE AND TECHNOLOGY CO. LTD. (CN)

( * ) Notice: Subject to any disclaimer, the term of this patent is extended or adjusted under 35 U.S.C. 154(b) by 0 days.

(21) Appl. No.: 13/818,699

(22) PCT Filed: Nov. 7, 2011

(86) PCT No.: PCT/CN2011/081848
§ 371 (c)(1),
(2), (4) Date: Feb. 25, 2013

(87) PCT Pub. No.: WO2013/010357
PCT Pub. Date: Jan. 24, 2013

(65) Prior Publication Data
US 2014/0235428 A1 Aug. 21, 2014

(30) Foreign Application Priority Data

Jul. 21, 2011 (CN) .......................... 2011 1 0203814

(51) Int. Cl.
*B01J 37/30* (2006.01)
*B01J 31/00* (2006.01)
(Continued)

(52) U.S. Cl.
CPC .............. *B01J 31/08* (2013.01); *B01J 23/8906* (2013.01); *B01J 37/0244* (2013.01); *B01J 37/16* (2013.01); *C02F 1/70* (2013.01); *C02F 2101/36* (2013.01); *C02F 2101/363* (2013.01)

(58) Field of Classification Search
CPC ........ B01J 21/16; B01J 23/89; B01J 23/8906; B01J 23/892; B01J 23/8926
USPC ............ 502/11, 159, 258, 326, 338, 339, 439
See application file for complete search history.

(56) References Cited

U.S. PATENT DOCUMENTS

| 3,024,207 | A | * | 3/1962 | Shaw ..................... B01J 47/007 521/134 |
| 4,324,645 | A | * | 4/1982 | Angevine et al. ............... 208/50 |

(Continued)

FOREIGN PATENT DOCUMENTS

| CN | 1515356 A | 7/2004 |
| CN | 101497051 A | 8/2009 |

OTHER PUBLICATIONS

Jia, Hanzhong et al., Effect of pH, Palladium and Iron Content on Dechlorination of 1-6 Pentachlorophenol Using Smectite Supported Iron—Palladium Bimetallic System, 2011 International Conference on Computer Distributed Control and Intelligent Environmental Monitoring, Feb. 20, 2011, pp. 1161-1164, ISBN: 978-1-61284-278-3.

(Continued)

*Primary Examiner* — Cam N. Nguyen
(74) *Attorney, Agent, or Firm* — Schmeiser, Olsen & Watts, LLP

(57) ABSTRACT

A highly active supported bimetallic nanocatalyst and its preparation method is disclosed. During the preparation, using an ion exchange or adsorption resin bearing basic functional groups as the support of the said catalyst, successively introducing the first metal precursor $FeCl_4^-$ and the second metal precursor ($PdCl_4^{2-}$, $NiCl_4^{2-}$ or $CuCl_4^{2-}$) onto the resin through ion exchange process; then under the protection of nitrogen gas, simultaneously reducing the two metals with either $NaBH_4$ or $KBH_4$; washing the resulting material with deoxygenated water and drying it, and the said catalyst is therefore obtained. The supported bimetallic material is characteristic of independent distribution of the two metals within the support. The independently distributed structure of the two metals enhances the catalytic efficiency of the second metal and the catalytic stability.

6 Claims, 2 Drawing Sheets

(51) Int. Cl.
*B01J 21/00* (2006.01)
*B01J 21/04* (2006.01)
*B01J 23/02* (2006.01)
*B01J 23/40* (2006.01)
*B01J 23/42* (2006.01)
*B01J 23/44* (2006.01)
*B01J 23/70* (2006.01)
*B01J 23/74* (2006.01)
*B01J 31/08* (2006.01)
*B01J 37/02* (2006.01)
*B01J 37/16* (2006.01)
*B01J 23/89* (2006.01)
*C02F 1/70* (2006.01)
*C02F 101/36* (2006.01)

(56) References Cited

U.S. PATENT DOCUMENTS

| | | | |
|---|---|---|---|
| 4,657,888 A * | 4/1987 | Mesters et al. | 502/331 |
| 5,208,392 A * | 5/1993 | Lee et al. | 568/836 |
| 6,537,515 B1 * | 3/2003 | Baker et al. | 423/447.3 |
| 6,849,245 B2 * | 2/2005 | Baker et al. | 423/447.3 |
| 7,632,775 B2 * | 12/2009 | Zhou et al. | 502/300 |
| 7,635,236 B2 * | 12/2009 | Zhao et al. | 405/128.75 |
| 7,790,776 B2 * | 9/2010 | Christensen et al. | 518/715 |
| 7,838,459 B2 * | 11/2010 | Nagy et al. | 502/300 |
| 7,887,880 B2 * | 2/2011 | Zhao et al. | 427/127 |
| 8,088,485 B2 * | 1/2012 | Harutyunyan et al. | 428/403 |
| 8,163,263 B2 * | 4/2012 | Harutyunyan et al. | 423/447.3 |
| 8,178,463 B2 * | 5/2012 | Stamenkovic et al. | 502/101 |
| 8,591,858 B2 * | 11/2013 | Harutyunyan et al. | 423/447.3 |
| 8,703,639 B2 * | 4/2014 | Wan et al. | 502/185 |
| 2002/0054849 A1 * | 5/2002 | Baker et al. | 423/447.2 |
| 2003/0099592 A1 * | 5/2003 | Rodriguez et al. | 423/445 R |
| 2003/0134409 A1 * | 7/2003 | Mallouk et al. | 435/262.5 |
| 2004/0071625 A1 * | 4/2004 | Baker et al. | 423/447.3 |
| 2006/0105910 A1 * | 5/2006 | Zhou et al. | 502/338 |
| 2007/0202304 A1 * | 8/2007 | Golovko et al. | 428/195.1 |
| 2009/0274609 A1 * | 11/2009 | Harutyunyan et al. | 423/445 B |
| 2010/0126944 A1 | 5/2010 | Braida et al. | |

OTHER PUBLICATIONS

Yang, Lei et al., Catalytic dechlorination of monochlorobenzene by Pd!Fe nanoparticles immobilized within a polymeric anion exchanger, Chemical Engineering Journal, Oct. 19, 2011, vol. 178, pp. 161-167, ISSN: 1385-8947.

International Search Report; PCT /CN20 11/081848; Int'l File Date: Nov. 7, 2011; Nanjing University et al.; 4 pages.

Wang, C. B. and Zhang, W. X. "Synthesizing nanoscale iron particles for rapid and complete dechlorination of TCE and PCBs." Environmental Science&Technolgy 31.7 (1997): 154-2156.

Zhu, B. W. and Lim, T. T. 2007. "Catalytic Reduction of Chlorobenzenes with Pd/Fe Nanoparticles: Reactive Sites, Catalyst Stability, Particle Aging, and Regeneration." Environ. Sci. Technol 41 (2007): 7523-7529.

* cited by examiner

SUPPORTED BIMETALLIC NANOCOMPOSITE CATALYST AND THE PREPARATION METHOD THEREOF

CROSS REFERENCE TO RELATED APPLICATIONS

This application is a National Stage Entry of PCT/CN2011/081848 filed on Nov. 7, 2011, which claims the benefit and priority of Chinese Patent Application No. 201110203814.1, filed on Jul. 21, 2011, the content of which are each incorporated herein by reference.

FIELD OF TECHNOLOGY

This invention relates to a bimetallic composite catalyst and its preparation method, more specifically to a supported bimetallic nanocomposite catalyst and its preparation method wherein the loading mode of the second metal on the support is improved so that the second metal can exert its catalytic function in a sustained and stable way.

BACKGROUND

After Wang and Zhang initially investigated the dechlorination effect of the nanosized zerovalent iron (nZVI) in treatment of organochlorine compounds in 1997 [Wang, C. B. and Zhang, W. X. "Synthesizing nanoscale iron particles for rapid and complete dechlorination of TCE and PCBs." *Environmental Science & Technology* 31.7 (1997): 154-2156.], the nanosized zerovalent iron, due to its large specific surface area and high reaction activity, has become a research focus in such fields as in situ groundwater remediation and treatment of sewage chloroorganics; in order to effectively reduce agglomeration of nanoparticles and control high head pressure, resin, membrane and activated carbon are adopted as the support for the nanomaterial; namely, the supported nZVI is more widely used in practical application. However, despite the general high activity of the supported nZVI, it presents low efficiency and incompleteness in degrading recalcitrant chloroorganics such as chlorobenzene and polychlorinated biphenyls (PCBs); besides, some products emerged during the degradation process present even higher toxicity (for example, when nZVI is utilized to reduce some organic halogens, the products may bear higher toxicity than the original pollutants and become even more difficult to be further degraded by iron). In order to further improve the reaction activity of the supported nZVI and to extend its service life, researchers introduce a second metal, for example, palladium (Pd), nickel (Ni), copper (Cu) and Platinum (Pt), onto the support; the loaded second metal on the surface of nZVI can engender satisfactory catalytic effect and high efficiency by accelerating the fuel cell reaction (with numerous microfuel cells being formed in the system) that facilitates nZVI losing electrons and lowers down the activation energy. Currently, the conventional method for preparing the supported bimetallic nanocatalyst goes as follows: first, adopting a reductive to reduce the high-valent iron into nanosized zerovalent iron and loading it on the support, then making use of the reducibility of the zerovalent iron and loading the ionic second metal on the support through reduction reaction. The second metal in the bimetallic nanocatalyst prepared with this method is loaded on the surface of the zerovalent iron through deposition process. As the catalytic reduction progresses, the iron on the support corrodes away, and the second metal loaded on the surface of the iron is also washed away, which consequently greatly lowers down the catalytic activity of the composite catalyst [Zhu, B. W. and Lim, T. T. 2007. "Catalytic Reduction of Chlorobenzenes with Pd/Fe Nanoparticles: Reactive Sites, Catalyst Stability, Particle Aging, and Regeneration." *Environ. Sci. Technol* 41 (2007): 7523-7529.].

In 2009, (China) Nanjing University successfully applied for two patents: "Nanocomposite Resin Loaded with Zerovalent Iron for Catalyst Degradation of Pollutants and the Preparation Method Thereof" (Application Number: 200910028413.X; Publication Number: CN101474560) and "Iron-loaded Bimetallic Nanocomposite Cation Exchange Resin and the Preparation Method Thereof" (Application Number: 200910028414; Publication Number: CN101497051A). The bimetallic materials mentioned in this two patents are prepared as follows: firstly, loading the iron precursor on the support and reducing the precursor with NaBH$_4$ or KBH$_4$; the supported nanosized zerovalent iron is therefore obtained; then, soaking the iron-loaded resin in the saline solution of a second metal so that the reducibility of zerovalent iron can be utilized to load the ionic second metal through reduction reaction. The two metals prepared in this way are interdependently distributed within the support in that the second metal deposits on the surface of the zerovalent iron and the two metals constitute a core-shell structure.

Currently, the conventional method for preparing the supported bimetallic nanocatalyst goes as follows: adopting firstly a reductive to reduce the high-valent iron into nanosized zerovalent iron and loading it on the support, then making use of the reducibility of the zerovalent iron and loading the ionic second metal on the support. The second metal of the bimetallic nanocatalyst prepared with this method is directly loaded on the surface of the zerovalent iron. As the catalytic reduction progresses, the iron on the support corrodes away, and the second metal loaded on the surface of the iron is also washed away, which consequently greatly lowers down the catalytic activity of the composite catalyst.

Up to present, there is not any documentation reporting a method that utilizes the ion exchange effect to load a second metal on the support and to realize independent distribution of the zerovalent iron and the second metal so that the catalytic stability of the material can be improved.

SUMMARY

1. The Technical Problems to be Solved

In consideration of defects shown in the prior art of preparing the bimetallic nanocatalyst by directly loading the second metal on the surface of the zerovalent iron, which, as the catalytic reduction progresses, results in gradual loss of the second metal along with the corrosion of the iron within the support and great decrease of the catalytic activity of the composite catalyst as a whole, this invention provides a new supported bimetallic nanocomposite catalyst and its preparation method. During the preparation, the loading mode of the second metal is improved to guarantee independent distribution of the zerovalent iron and the second metal, which can effectively solve the defects presenting in the prior art, and the supported catalyst can maintain high activity in degradation process even after multiple rounds of application.

2. Technical Solutions

The principle of this invention is: successively introducing the iron precursor and the second metal precursor onto the resin through ion exchange process; then simultaneously reducing the iron precursor and the second metal precursor with either NaBH$_4$ or KBH$_4$; this procedure can effectively prevent the second metal depositing on the surface of the iron, which consequently realizes the independent distribution of the zerovalent iron and the second metal within the support. The bimetallic material with independent distribution of iron and the second metal so obtained guarantees sustained and stable catalytic activity of the composite material in that the second metal would securely exist within the support even though the iron therein gradually corrodes away during the degradation process.

A supported bimetallic nanocomposite catalyst, wherein the support of the said supported bimetallic nanocomposite catalyst is the ion exchange or adsorption resin bearing basic functional groups; there are two types of nanosized zerovalent metal particles: the first metal is iron, and the second metal is catalytically active and atoms of which can form anionic complexes with chloride ions.

The iron precursor and the second metal precursor are successively introduced onto the inner and outer surfaces of the resin through ion exchange process; the said two metal are independently distributed within the support.

a method for preparing a supported bimetallic nanocomposite catalyst, consisting of the following steps: using the styrenic or acrylic ion exchange resin bearing basic functional groups as the support; introducing firstly the anionic complex FeCl$_4^-$ in a solution onto the resin through ion exchange process, and then the anionic complex formed by a second metal (for example, PdCl$_4^{2-}$) onto the said resin through ion change process; under the protection of nitrogen gas, reducing the resin so obtain with either NaBH$_4$ or KBH$_4$, then washing it several times with deoxygenated water; putting the material in a vacuum dryer for drying and the supported bimetallic catalyst is therefore obtained.

The preferred support materials are resin D-201, D-301, NDA-900, Amberlite IRA-900, Amberlite IRA958, Amberlite IRA-96, Purolite C-100, Purolite A500, WBR109, NDA-88 and NDA-99; the eligible second metals are inorganic metal elements such as palladium, copper, nickel and platinum that can form anionic complexes with chloride ions; the concentration of NaBH$_4$ or KBH$_4$ is 1-5 mol/L, and the solution is aqueous containing 50% ethanol by volume, keeping the reaction till no bubbles popping out from the solution.

3. Beneficial Effects

This invention provides a supported bimetallic nanocomposite catalyst and its preparation method; during the preparation, two types of metallic atoms are successively introduced onto the inner and outer surfaces of the support resin; this method realizes independent distribution of nZVI and the second metal within the support, which reduces the consumption of the second metal in practical application and consequently improves the catalytic stability and activity of the composite material. The supported bimetallic material prepared with the method disclosed herein is characteristic of independent distribution of the two metals within the support; it has significant difference from the supported catalyst prepared with the conventional method wherein the second metal is reduced by zerovalent iron and the two metals in the catalyst are interdependent. The independently distributed structure of the two metals greatly enhances the catalytic efficiency of the second metal and improves the catalytic stability of the said supported composite material as a whole. This invention has significant referential value to the preparation of the supported bimetallic catalyst adopting membrane, activated carbon or other types of resin as the support.

BRIEF DESCRIPTION

DETAILED DESCRIPTION

The present invention is more specifically described in the following embodiments.

Embodiment 1

Figure 1:
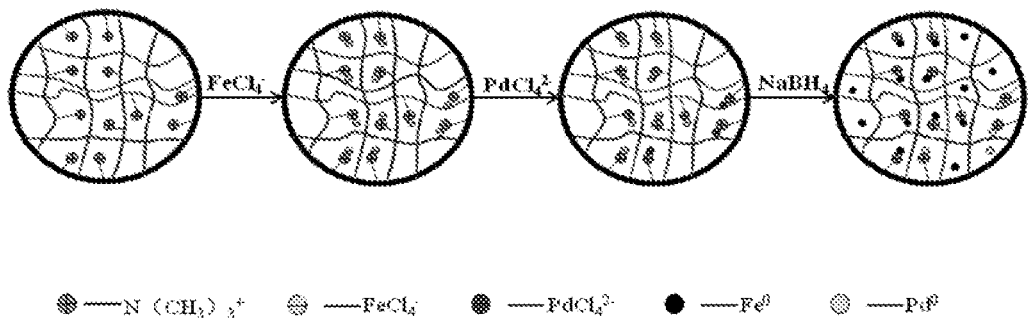
FIG. 1 is the structural representation of the supported bimetallic catalyst prepared in embodiment 1.

Using strong base anion resin D201 [containing quarternary ammonium groups, manufactured by (China) Hangzhou Zhengguang Resin Co., Ltd.] as the support, soaking it in saturated NaCl solution containing FeCl$_3$.6H$_2$O; the said solution contains 1 mol/L FeCl$_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.05 mol/L Na$_2$PdCl$_4$ solution (solid-liquid ratio is 1:2); after 6 hours of ion exchange and then filtration, washing the resin 3 times with ethanol. Mixing the resin so obtained with 1 mol/L NaBH$_4$ or KBH$_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium as shown in FIG. 1 is obtained, wherein the mass fraction of iron (to resin) is 10% and the mass fraction of palladium (to iron) is 0.6%; the size of nanoparticles is 10-100 nm.

Figure 2:
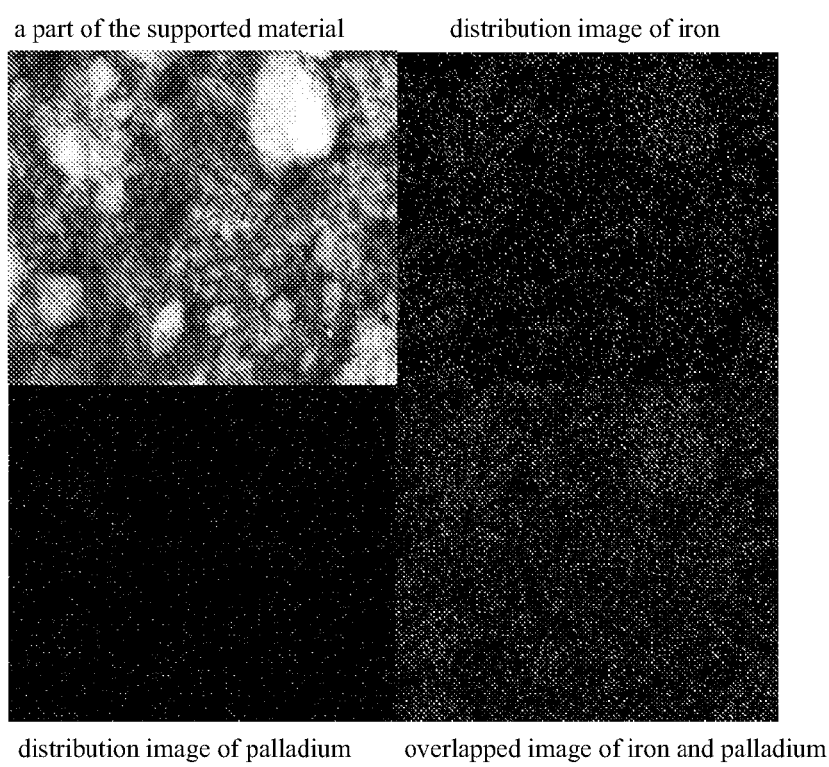
FIG. 2 is the SEM image of the supported bimetallic catalyst prepared in embodiment 1.
Figure 3:
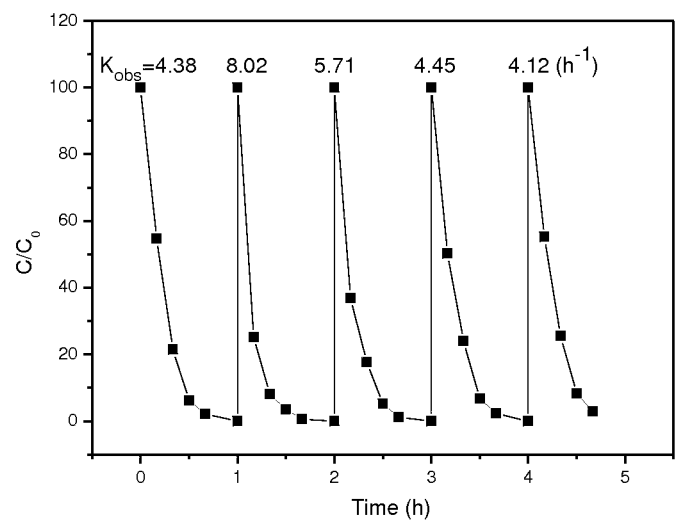
FIG. 3 shows the effect of the stability test of the supported bimetallic catalyst prepared in embodiment 1.

Analyzing a part of the supported material with the SEM-EDX method, overlapping the distribution diagrams of iron and palladium so obtained for examination; as is clearly shown in FIG. 2, the iron and the palladium are independently distributed within the pore canals of the resin. Adopting the said supported bimetallic catalyst with independently distributed iron and palladium for degradation of chlorobenzene; the initial concentration of chlorobenzene is 20 mg/L, adding in the resin at the rate of 1 g(Fe)/L; after 30 minutes of treatment by the said composite resin, 97% of chlorobenzene is removed; the pseudo first-order kinetics constant is 0.0699 min$^{-1}$. The long-term working performance of the said composite resin is investigated in 5 rounds of repeated application; as indicated in FIG. 3, its efficiency in degrading and removing chlorobenzene remains without significant decrease. Determining the content of palladium in the resin after 5 rounds of repeated application, the result is almost the same with the content of palladium in the newly synthesized material; this fact proves that this new mode of loading palladium can effectively prevent its loss and guarantee the catalytic stability of the composite material in degradation process.

Embodiment 2

Using weak base anion resin D301 [containing tertiary ammonium groups, manufactured by (China) Hangzhou Zhengguang Resin Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.1 mol/L $CuCl_2 \cdot 2H_2O$ (solid-liquid ratio is 1:2); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and copper is obtained, wherein the mass fraction of iron (to resin) is 15% and the mass fraction of copper (to iron) is 2%; the size of nanoparticles is 10-100 nm.

Analyzing the material with such characterization methods as TEM and SEM, the result proves that iron and copper are independently distributed within the pore canals of the resin. Adopting the said supported bimetallic catalyst with independently distributed iron and copper for degradation of nitrates; the initial concentration of nitrates is 20 mg/L, adding in the resin at the rate of 1 g(Fe)/L; within 2 hours of treatment by the said composite resin, the concentration of nitrates decreases lower than 0.1 mg/L. After 5 rounds of repeated experiment, the observed result indicates that the efficiency of the composite resin in degrading nitrates remains without significant decrease even after long time of repeated application.

Embodiment 3

Using resin NDA-900 [containing amino groups, provided by (China) Jiangsu N&J Environmental Technology Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.2 mol/L $NiCl_2 \cdot 6H_2O$ (solid-liquid ratio is 1:2); after 6 hours of ion exchange and then filtration, washing the resin 3 times with ethanol. Mixing the resin so obtained with 3 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and nickel is obtained, wherein the mass fraction of iron (to resin) is 15% and the mass fraction of nickel (to iron) is 2%; the size of nanoparticles is 10-100 nm.

Analyzing the material with such characterization methods as TEM and SEM, the result proves that iron and nickel are independently distributed within the pore canals of the resin. Adopting the said supported bimetallic catalyst with independently distributed iron and nickel for degradation of 1,3-dichlorophenol; the initial concentration of 1,3-dichlorophenol is 20 mg/L, adding in the resin at the rate of 1 g(Fe)/L; after 4 hours of treatment by the said composite resin, 95% of 1,3-dichlorophenol is removed. After 5 rounds of repeated experiment, the observed result indicates that the efficiency of the composite resin in degrading 1,3-dichlorophenol remains without significant decrease even after long time of repeated application.

Embodiment 4

Using Amberlite IRA-900 [containing quarternary ammonium groups, manufactured by (U.S.) Rohm Haas Company] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.1 mol/L $Na_2PtCl_4$ solution (solid-liquid ratio is 1:2); after 6 hours of ion exchange and then filtration, washing the resin 3 times with ethanol. Mixing the resin so obtained with 4 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and platinum is obtained, wherein the mass fraction of iron (to resin) is 12% and the mass fraction of platinum (to iron) is 1%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of trichloroethylene (TCE); the initial concentration of TCE is 20 mg/L, adding in the resin at the rate of 1 g(Fe)/L; after 2 hours of treatment by the said composite resin, 98% of TCE is removed. After 5 rounds of repeated experiment, the observed result indicates that the efficiency of the composite resin in degrading TCE remains without significant decrease even after long time of repeated application.

Embodiment 5

Using Amberlite IRA-958 [acrylic matrix, containing quarternary ammonium groups, manufactured by (U.S.) Rohm Haas Company] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.1 mol/L $Na_2PdCl_4$ solution (solid-liquid ratio is 1:2); after 6 hours of ion exchange and then filtration, washing the resin 3 times with ethanol. Mixing the resin so obtained with 5 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 10% and the mass fraction of palladium (to iron) is 1%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of trichloroethylene (TCE); the initial concentration of TCE is 20 mg/L, adding in the resin at the rate of 1 g(Fe)/L; after 1 hours of treatment by the said composite resin, 98% of TCE is removed. After 5 rounds of repeated experiment, the observed result indicates that the efficiency of the composite resin in degrading TCE remains without significant decrease even after long time of repeated application.

Embodiment 6

Using Amberlite IRA-96 [containing ammonium groups, manufactured by (U.S.) Rohm Haas Company] as the support, soaking it in saturated NaCl solution containing $FeCl_3.6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.2 mol/L $CuCl_2.2H_2O$ (solid-liquid ratio is 1:4); after 6 hours of ion exchange and then filtration, washing the resin 3 times with ethanol. Mixing the resin so obtained with 1 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and copper is obtained, wherein the mass fraction of iron (to resin) is 8% and the mass fraction of copper (to iron) is 5%; the size of nanoparticles is 10-100 nm.

Analyzing the material with such characterization methods as TEM and SEM, the result proves that iron and copper are independently distributed within the pore canals of the resin. Adopting the said supported bimetallic catalyst with independently distributed iron and copper for degradation of trichloroethylene (TCE); the initial concentration of TCE is 20 mg/L, adding in the resin at the rate of 1 g(Fe)/L; after 4 hours of treatment by the said composite resin, 98% of TCE is removed. After 5 rounds of repeated experiment, the observed result indicates that the efficiency of the composite resin in degrading TCE remains without significant decrease even after long time of repeated application.

Embodiment 7

Using Purolite C-100 [containing quarternary ammonium groups, manufactured by (U.S.) Purolite Company] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in saturated NaCl solution containing 0.5 mol/L $NiCl_2.6H_2O$ (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and nickel is obtained, wherein the mass fraction of iron (to resin) is 10% and the mass fraction of nickel (to iron) is 10%; the size of nanoparticles is 10-100 nm.

Analyzing the material with such characterization methods as TEM and SEM, the result proves that iron and nickel are independently distributed within the pore canals of the resin. Adopting the said supported bimetallic catalyst with independently distributed iron and nickel for degradation of 1,2,4-trichlorophenol; the initial concentration of 1,2,4-trichlorophenol is 20 mg/L, adding in the resin at the rate of 1 g(Fe)/L; after 4 hours of treatment by the said composite resin, 95% of 1,2,4-trichlorophenol is removed. After 5 rounds of repeated experiment, the observed result indicates that the efficiency of the composite resin in degrading 1,2,4-trichlorophenol remains without significant decrease even after long time of repeated application.

Embodiment 8

Using Purolite A-500 [containing quarternary ammonium groups, manufactured by (U.S.) Purolite Company] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in 0.2 mol/L $Na_2PtCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and platinum is obtained, wherein the mass fraction of iron (to resin) is 10% and the mass fraction of platinum (to iron) is 2%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of trichloroethylene (TCE); the initial concentration of TCE is 20 mg/L, adding in the resin at the rate of 1 g(Fe)/L; after 4 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 9

Using WBR109 [containing quarternary ammonium groups, manufactured by (China) Wangdong Chemical Plant]

as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.2 mol/L $Na_2PdCl_4$ solution (solid-liquid ratio is 1:2); after 6 hours of ion exchange and then filtration, washing the resin 3 times with ethanol. Mixing the resin so obtained with 5 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 12% and the mass fraction of palladium (to iron) is 1.5%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of 1,3-dichlorobenzene; the initial concentration of 1,3-dichlorobenzene is 20 mg/L, adding in the resin at the rate of 1 g(Fe)/L; after 2 hours of treatment by the said composite resin, 98% of 1,3-dichlorobenzene is removed. After 5 rounds of repeated experiment, the observed result indicates that the efficiency of the composite resin in degrading 1,3-dichlorobenzene remains without significant decrease even after long time of repeated application.

Embodiment 10

Using resin NDA-889 [containing ammonium groups, manufactured by (China) Jiangsu N&J Environmental Technology Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.3 mol/L $CuCl_2 \cdot 2H_2O$ (solid-liquid ratio is 1:4); after 6 hours of ion exchange and then filtration, washing the resin 3 times with ethanol. Mixing the resin so obtained with 1 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and copper is obtained, wherein the mass fraction of iron (to resin) is 10% and the mass fraction of copper (to iron) is 6%; the size of nanoparticles is 10-100 nm.

Analyzing the material with such characterization methods as TEM and SEM, the result proves that iron and copper are independently distributed within the pore canals of the resin. Adopting the said supported bimetallic catalyst with independently distributed iron and copper for degradation of trichloroethylene (TCE); the initial concentration of TCE is 20 mg/L, adding in the resin at the rate of 1 g(Fe)/L; after 3 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 11

Using resin NDA-99 [containing quarternary ammonium groups, provided by (China) Jiangsu N&J Environmental Technology Co., Ltd.] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in saturated NaCl solution containing 1 mol/L $NiCl_2 \cdot 6H_2O$ (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and nickel is obtained, wherein the mass fraction of iron (to resin) is 12% and the mass fraction of nickel (to iron) is 8%; the size of nanoparticles is 10-100 nm.

Analyzing the material with such characterization methods as TEM and SEM, the result proves that iron and nickel are independently distributed within the pore canals of the resin. Adopting the said supported bimetallic catalyst with independently distributed iron and nickel for degradation of 1,4-dichlorophenol; the initial concentration of 1,4-dichlorophenol is 20 mg/L, adding in the resin at the rate of 1 g(Fe)/L; after 4 hours of treatment by the said composite resin, 97% of 1,4-dichlorophenol is removed. After 5 rounds of repeated experiment, the observed result indicates that the efficiency of the composite resin in degrading 1,4-dichlorophenol remains without significant decrease even after long time of repeated application.

Embodiment 12

Using strong base anion resin D201 [containing quarternary ammonium groups, manufactured by (China) Hangzhou Zhengguang Resin Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.2 mol/L $Na_2PtCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and platinum is obtained, wherein the mass fraction of iron (to resin) is 15% and the mass fraction of platinum (to iron) is 1%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of trichloroethylene (TCE); the initial concentration of TCE is 20 mg/L, adding in the resin at the rate of 1 g(Fe)/L; after 2 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 13

Using weak base anion resin D301 [containing tertiary ammonium groups, manufactured by (China) Hangzhou Zhengguang Resin Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.5 mol/L $NiCl_2 \cdot 6H_2O$ (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and nickel is obtained, wherein the mass fraction of iron (to resin) is 14% and the mass fraction of nickel (to iron) is 5%; the size of nanoparticles is 10-100 nm.

Analyzing the material with such characterization methods as TEM and SEM, the result proves that iron and nickel are independently distributed within the pore canals of the resin. Adopting the said supported bimetallic catalyst with independently distributed iron and nickel for degradation of 1,4-dichlorophenol; the initial concentration of 1,4-dichlorophenol is 20 mg/L, adding in the resin at the rate of 1 g(Fe)/L; after 6 hours of treatment by the said composite resin, 97% of 1,4-dichlorophenol is removed. After 5 rounds of repeated experiment, the observed result indicates that the efficiency of the composite resin in degrading 1,4-dichlorophenol remains without significant decrease even after long time of repeated application.

Embodiment 14

Using resin NDA-900 [containing amino groups, provided by (China) Jiangsu N&J Environmental Technology Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.2 mol/L $Na_2PdCl_4$ solution (solid-liquid ratio is 1:2); after 6 hours of ion exchange and then filtration, washing the resin 3 times with ethanol. Mixing the resin so obtained with 5 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 10% and the mass fraction of palladium (to iron) is 1.0%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of 1,3-dichlorobenzene; the initial concentration of 1,3-dichlorophenol is 20 mg/L, adding in the resin at the rate of 1 g(Fe)/L; after 3 hours of treatment by the said composite resin, 98% of 1,3-dichlorobenzene is removed. After 5 rounds of repeated experiment, the observed result indicates that the efficiency of the composite resin in degrading 1,3-dichlorobenzene remains without significant decrease even after long time of repeated application.

Embodiment 15

Using Amberlite IRA-900 [containing quarternary ammonium groups, manufactured by (U.S.) Rohm Haas Company] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in saturated NaCl solution containing 0.5 mol/L$CuCl_2 \cdot 2H_2O$ (solid-liquid ratio is 1:4); after 6 hours of ion exchange and then filtration, washing the resin 3 times with ethanol. Mixing the resin so obtained with 1 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and copper is obtained, wherein the mass fraction of iron (to resin) is 12% and the mass fraction of copper (to iron) is 8%; the size of nanoparticles is 10-100 nm.

Analyzing the material with such characterization methods as TEM and SEM, the result proves that iron and copper are independently distributed within the pore canals of the resin. Adopting the said supported bimetallic catalyst with independently distributed iron and copper for degradation of trichloroethylene (TCE); the initial concentration of TCE is 20 mg/L, adding in the resin at the rate of 1 g(Fe)/L; after 2 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 16

Using Amberlite IRA-958 [acrylic matrix, containing quarternary ammonium groups, manufactured by (U.S.)

Rohm Haas Company] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.1 mol/L $Na_2PtCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and platinum is obtained, wherein the mass fraction of iron (to resin) is 12% and the mass fraction of platinum (to iron) is 0.8%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of trichloroethylene (TCE); the initial concentration of TCE is 20 mg/L, adding in the resin at the rate of 1 g(Fe)/L; after 3 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 17

Using Amberlite IRA-96 [containing ammonium groups, manufactured by (U.S.) Rohm Haas Company] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.5 mol/L $Na_2PdCl_4$ solution (solid-liquid ratio is 1:2); after 6 hours of ion exchange and then filtration, washing the resin 3 times with ethanol. Mixing the resin so obtained with 5 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 10% and the mass fraction of palladium (to iron) is 2.0%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of 2,4-dichlorophenol; the initial concentration of 2,4-dichlorophenol is 20 mg/L, adding in the resin at the rate of 1 g(Fe)/L; after 2 hours of treatment by the said composite resin, 98% of 2,4-dichlorophenol is removed. After 5 rounds of repeated experiment, the observed result indicates that the efficiency of the composite resin in degrading 2,4-dichlorophenol remains without significant decrease even after long time of repeated application.

Embodiment 18

Using Purolite C-100 [containing quarternary ammonium groups, manufactured by (U.S.) Purolite Company] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in saturated NaCl solution containing 0.5 mol/L $CuCl_2 \cdot 2H_2O$ (solid-liquid ratio is 1:4); after 6 hours of ion exchange and then filtration, washing the resin 3 times with ethanol. Mixing the resin so obtained with 1 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and copper is obtained, wherein the mass fraction of iron (to resin) is 12% and the mass fraction of copper (to iron) is 10%; the size of nanoparticles is 10-100 nm.

Analyzing the material with such characterization methods as TEM and SEM, the result proves that iron and copper are independently distributed within the pore canals of the resin. Adopting the said supported bimetallic catalyst with independently distributed iron and copper for degradation of nitrates; the initial concentration of nitrates is 20 mg/L, adding in the resin at the rate of 1 g(Fe)/L; after 2 hours of treatment by the said composite resin, 97% of nitrates are removed. After 5 rounds of repeated experiment, the observed result indicates that the efficiency of the composite resin in degrading nitrates remains without significant decrease even after long time of repeated application.

Embodiment 19

Using Purolite A-500 [containing quarternary ammonium groups, manufactured by (U.S.) Purolite Company] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in 0.5 mol/L $Na_2PdCl_4$ solution (solid-liquid ratio is 1:2); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 10% and the mass fraction of palladium (to iron) is 1.0%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of 2,4-dichlorophenol; the initial concentration of 2,4-dichlorophenol is 20 mg/L, adding in the resin at the rate of 1 g(Fe)/L; after 2 hours of treatment by the said composite resin, 97% of 2,4-dichlorophenol is removed. After 5 rounds of repeated experiment, the observed result indicates that the efficiency of the composite resin in degrading 2,4-dichlorophenol remains without significant decrease even after long time of repeated application.

Embodiment 20

Using WBR109 [containing quarternary ammonium groups, manufactured by (China) Wangdong Chemical Plant] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.2 mol/L $Na_2PtCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40 for 6 hours, the supported bimetallic catalyst with independently distributed iron and platinum is obtained, wherein the mass fraction of iron (to resin) is 12% and the mass fraction of platinum (to iron) is 1%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of trichloroethylene (TCE); the initial concentration of TCE is 20 mg/L, adding in the resin at the rate of 1 g(Fe)/L; after 3 hours of treatment by the said composite resin, 97% of TCE is removed. After 5 rounds of repeated experiment, the observed result indicates that the efficiency of the composite resin in degrading TCE remains without significant decrease even after long time of repeated application.

Embodiment 21

Using resin NDA-88 [containing amino groups, manufactured by (China) Jiangsu N&J Environmental Technology Co., Ltd.] as the support, soaking it in saturated NaCl solution containing $FeCl_3 \cdot 6H_2O$; the said solution contains 1 mol/L $FeCl_3$, 2 mol/L HCl and saturated NaCl, and its solid-liquid ratio is 1:10. After 6 hours of oscillation reaction in a shaking incubator, washing the residual liquid off the resin surface with absolute ethanol and then adding in 0.1 mol/L $Na_2PdCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and palladium is obtained, wherein the mass fraction of iron (to resin) is 10% and the mass fraction of palladium (to iron) is 2.0%; the size of nanoparticles is 10-100 nm.

Analyzing the material with such characterization methods as TEM and SEM, the result proves that iron and palladium are independently distributed within the pore canals of the resin. Adopting the said supported bimetallic catalyst with independently distributed iron and palladium for degradation of chloroacetic acid; the initial concentration of chloroacetic acid is 5 mg/L, adding in the resin at the rate of 1 g(Fe)/L; after 2 hours of treatment by the said composite resin, 97% of chloroacetic acid is removed. After 5 rounds of repeated experiment, the observed result indicates that the efficiency of the composite resin in degrading chloroacetic acid remains without significant decrease even after long time of repeated application.

Embodiment 22

Using resin NDA-99 [containing quarternary ammonium groups, provided by (China) Jiangsu N&J Environmental Technology Co., Ltd.] as the support; the solution adopted herein contains 1 mol/L $FeCl_3$, 2 mol/L HCl and saturated NaCl; its solid-liquid ratio is 1:10. After 6 hours of oscillation reaction in a shaking incubator, washing the residual liquid off the resin surface with absolute ethanol and then adding in 0.2 mol/L $Na_2PtCl_4$ solution (solid-liquid ratio is 1:4); after 6 hours of ion exchange and then filtration, washing the resin 3 times with ethanol. Mixing the resin so obtained with 2 mol/L $NaBH_4$ or $KBH_4$ water solution (containing 10% ethanol by volume) for reaction under the condition of ultrasonic oscillation; keeping the mixing reaction till no bubbles popping out from the solution. When the reaction is complete, under the protection of nitrogen gas, filtering the mixture, transferring the resin and washing it with deoxygenated water and deoxygenated ethanol; putting the resin in a vacuum dryer and drying it at 40° C. for 6 hours, the supported bimetallic catalyst with independently distributed iron and platinum is obtained, wherein the mass fraction of iron (to resin) is 12% and the mass fraction of platinum (to iron) is 1%; the size of nanoparticles is 10-100 nm.

Analyzing the material with such characterization methods as TEM and SEM, the result proves that iron and platinum are independently distributed within the pore canals of the resin. Adopting the said supported bimetallic catalyst with independently distributed iron and platinum for degradation of perchloroethylene (PCE); the initial concentration of PCE is 20 mg/L, adding in the resin at the rate of 1 g(Fe)/L; after 2 hours of treatment by the said composite resin, 97% of PCE is removed. After 5 rounds of repeated experiment, the observed result indicates that the efficiency of the composite resin in degrading TCE remains without significant decrease even after long time of repeated application.

What is claimed is:

1. A supported bimetallic nanocomposite catalyst comprising:
    a support having a support resin comprised of a styrenic or acrylic ion exchange or adsorption resin, wherein the ion exchange or adsorption resin includes basic functional groups selected from the group consisting of a tertiary ammonium group, quaternary ammonium group and a basic heterocyclic group, wherein said support resin has a pore with an average size of 10-100 nm;

two zero valent metallic nanoparticles independently distributed within the pore of the support, the first of the two zero valent metallic nanoparticles being comprised of a first metal selected from iron and the second of the two zero valent metallic nanoparticles being comprised of a second metal selected from the group consisting of palladium, copper, nickel and platinum.

2. The supported bimetallic nanocomposite catalyst as defined in claim 1, wherein the mass fraction of the first metal to the support is 8%, 10%, 12%, 14% or 15% and the mass fraction of the second metal to the first metal is 0.6%, 0.8%, 1%, 1.5%, 2%, 5%, 6%, 8% or 10%.

3. The supported bimetallic nanocomposite catalyst of claim 1, wherein the support resin is D-201, D-301, NDA-900, Amberlite IRA-900, Amberlite IRA-958, Amberlite IRA-96, Purolite C-100, Purolite A500, WBR109, NDA-88 or NDA-99.

4. A method for preparing the supported bimetallic nanocomposite catalyst of claim 1, consisting of the following steps:

(A) introducing firstly the anionic complex $FeCl_4^-$ onto the styrenic or acrylic ion exchange or adsorption resin through an ion exchange process, and then loading the anionic complex formed by the second metal onto the said support resin through the ion exchange process;

(B) reducing the support resin under the protection of nitrogen gas, with either $NaBH_4$ or $KBH_4$, then washing the support resin several times with deoxygenated water and vacuum drying to obtain the supported bimetallic catalyst.

5. The method for preparing a supported bimetallic nanocomposite catalyst as defined in claim 4, wherein the support resin includes D-201, D-301, NDA-900, Amberlite IRA-900, Amberlite IRA-958, Amberlite IRA-96, Purolite C-100, Purolite A500, WBR109, NDA-88 and NDA-99.

6. The method for preparing a supported bimetallic nanocomposite catalyst as defined in claim 4, wherein the $NaBH_4$ or $KBH_4$ is 1-5 mol/L in concentration resulting in a solution that is aqueous containing 50% ethanol by volume; and maintaining the reaction until no bubbles are popping out from the solution.

* * * * *